Nov. 21, 1939.                R. W. BROWN                2,180,860
                           VEHICLE SUSPENSION
                         Filed Sept. 17, 1937         2 Sheets-Sheet 1
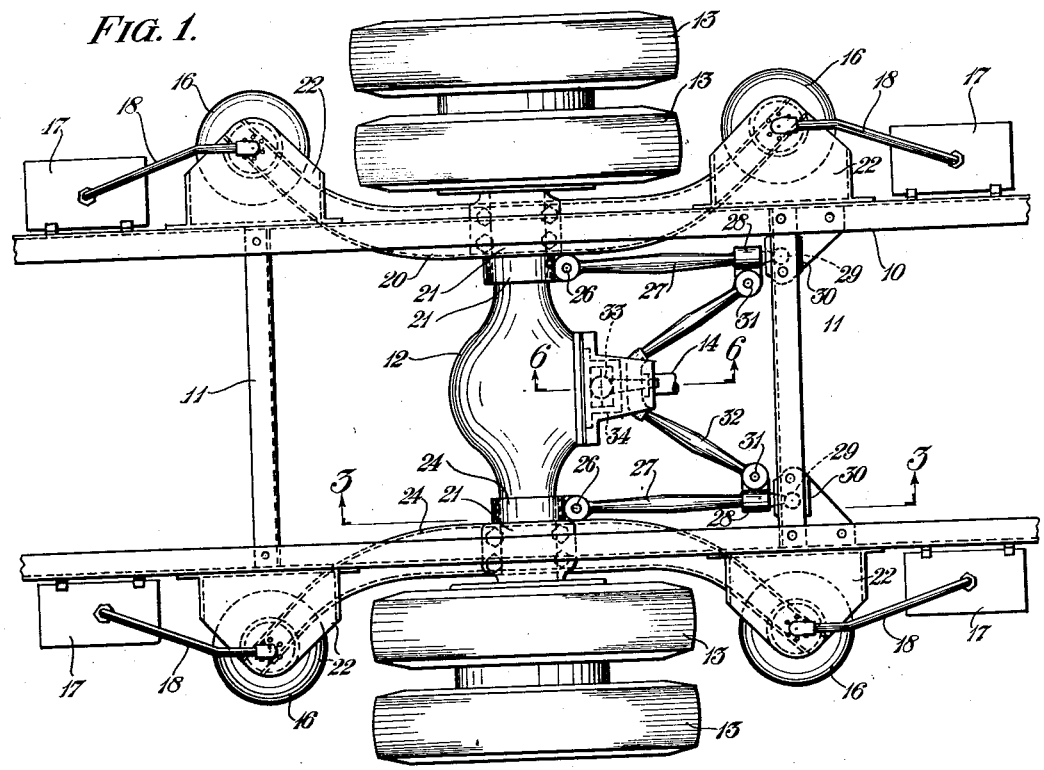
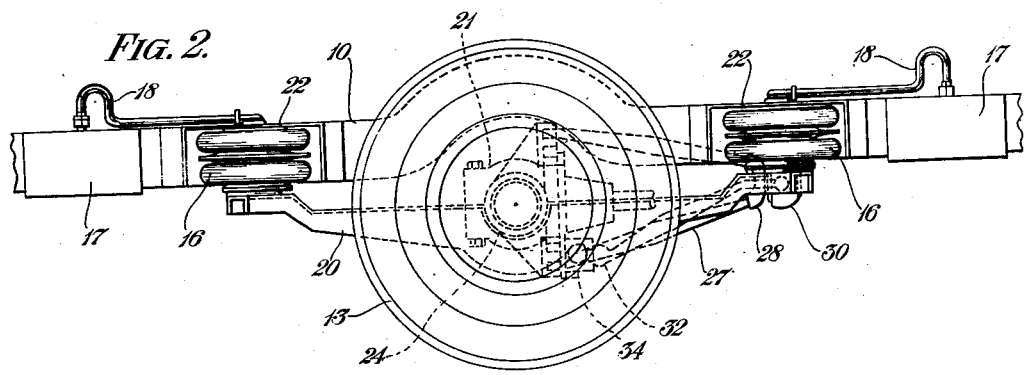
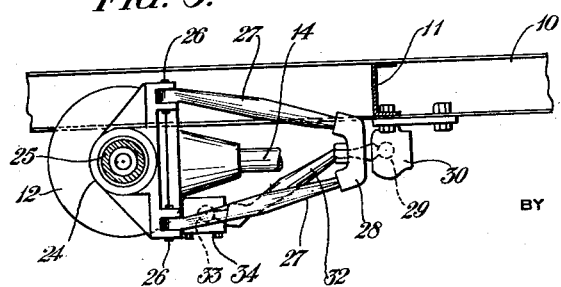
INVENTOR
Roy W Brown
BY
Albert L. Ely
ATTORNEY Nov. 21, 1939.   R. W. BROWN   2,180,860

VEHICLE SUSPENSION

Filed Sept. 17, 1937   2 Sheets—Sheet 2

INVENTOR
Roy W. Brown
BY Albert L. Ely
ATTORNEY

Patented Nov. 21, 1939

2,180,860

UNITED STATES PATENT OFFICE 2,180,860

VEHICLE SUSPENSION

Roy Wilbur Brown, Akron, Ohio, assignor to The Firestone Tire & Rubber Company, Akron, Ohio, a corporation of Ohio Application September 17, 1937, Serial No. 164,349

16 Claims. (Cl. 267—65)

This invention relates to vehicle suspensions, and more especially it relates to vehicle suspensions of the type that employ pneumatic structures for resiliently supporting the frame or body of the vehicle upon the axles thereof.

The invention is of primary utility in its application to motor trucks and the like which usually have a relatively high center of gravity when loaded, and is particularly applicable to the rear axles of trucks, where the driving power is applied.

The chief objects of the invention are to impart greater stability to the body of the vehicle; to reduce wear on tires; to facilitate steering of the vehicle; and to provide an improved arrangement of torque resisting members for controlling displacement of the rear axle of the vehicle relatively of the frame thereof. Other objects will be manifest as the specification proceeds.

Of the accompanying drawings:

Figure 1 is a fragmentary plan view of the frame and rear axle of a motor vehicle embodying the invention, in its preferred form;

Figure 2 is a side elevation thereof;

Figure 3 is a section on the line 3—3 of Figure 2;

Figure 4:
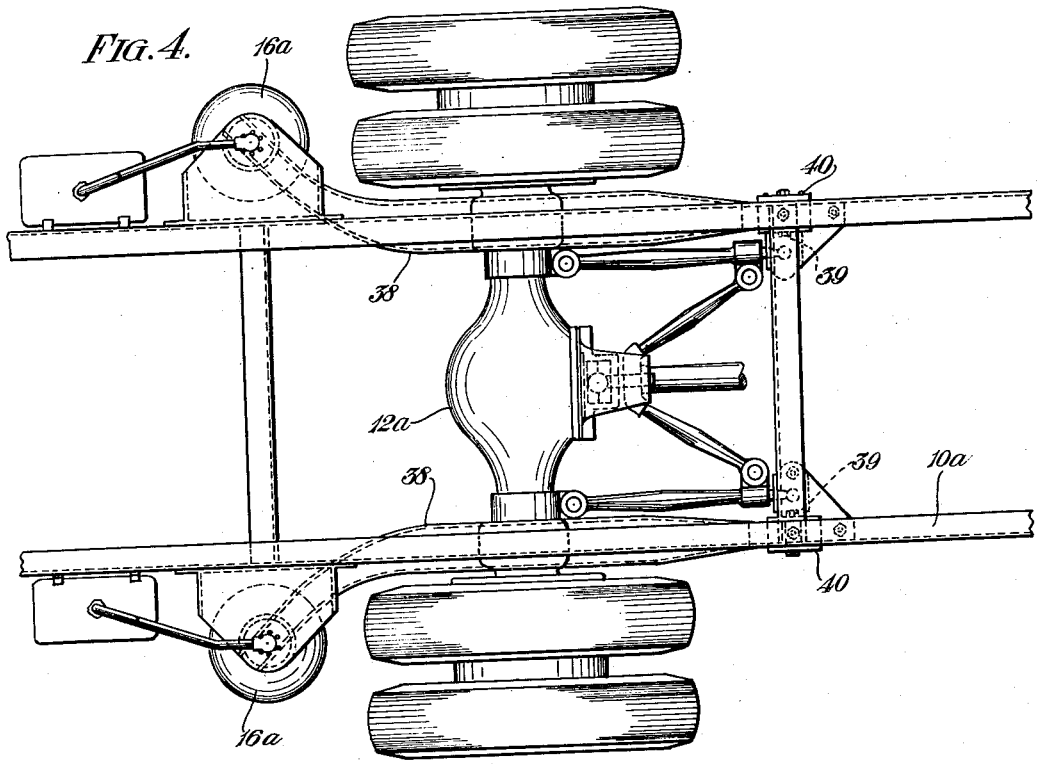
Figure 4 is a fragmentary plan view, similar to Figure 1, of another embodiment of the invention.

Referring especially to Figures 1 to 3 and 6 of the drawings, there is shown the rear end portion of the frame 10 of the vehicle, of which 11, 11 are cross-members or braces connecting opposite sides of said frame, said frame and cross-members being of channel form. Associated with said frame is an axle comprising an axle-housing 12, and a pair of dual, pneumatic-tired wheels 13, 13 at each end of the axle, the drive shaft of the axle being shown at 14.

The frame 10 is resiliently supported upon the axle by means of four pneumatic suspension devices that are arranged in pairs, two of them being disposed on each side of the vehicle frame, one device of each pair being disposed forwardly of the axle and one being disposed rearwardly thereof. Each of said suspension devices comprises a hollow, resilient bellows member 16, the interior of which is in communication with a reservoir 17 through the agency of a pipe 18, said reservoir being mounted upon the frame 10, preferably upon the side thereof. A valve member (not shown) positioned interiorly of the bellows 16 controls the flow of air between the latter and the reservoir 17 in a manner to cushion bound and to retard rebound of the frame. The specific construction of the pneumatic suspension devices is not a part of the present invention and need not be described in greater detail herein.

To secure stability of the body of the vehicle, it is desirable that the pneumatic suspension devices be positioned at the greatest practical distance from the longitudinal centerline of the frame, for the reason that stability varies as the cube of this distance. To this end each pair of bellows 16, on a side of the vehicle, is carried by a bracket 20 that has its medial region secured to the adjacent end of the axle housing 12 by means of a clamping member 21. As viewed in plan (see Figure 1) each bracket 20 is of general arcuate shape, the opposite ends thereof extending laterally beyond the sides of frame 10, and providing support thereat for respective bellows 16. The latter support the frame 10 by means of outboard brackets 22, 22 that are secured to the outer lateral faces of the frame and extend laterally therefrom to positions over respective bellows, to which they are secured. As is clearly shown in Figure 1, the bellows 16 are positioned outwardly of the frame 10 beyond the central plane of the innermost of the dual wheels 13, with the result that substantial stability of the vehicle body is assured.

For resisting torque and otherwise controlling displacement of the axle housing 12 relatively of the frame 10, there is provided a series of pivotally interconnected arms or rods that are pivotally connected to said axle housing and frame. To this end a collar 24 is mounted upon each end portion of the axle housing 12, there being a rubber bushing 25, Figure 3, under compression mounted between each collar and the axle housing so as yieldingly to resist relative angular movement therebetween. Each collar 24 is pivotally connected at 26, 26 to the respective arms 27, 27 of a two-arm link 28, one arm of the link being connected to the collar above the axis of the axle and the other being connected thereto below the axis of the axle, the axes of connections 26 being in vertical alignment. Preferably the pivotal connections 26 are of the oscillating joint type shown in the U. S. patent to Robertson, No. 2,049,024, issued July 28, 1936. From the pivotal connections 26, the arms 27 converge toward their juncture with the link body 28, and the latter has pivotal connection with the frame 10 through the agency of a ball and socket connection of which the ball portion 29 is integral with the link 28 and the socket member 30 is secured to cross-member 11 of the frame. The arrangement is such that the link-arms 27 at one end of the axle are parallel to the link-arms at the other end of the axle. Pivotally connected to link-bodies 28, on vertically disposed pivots 31, 31, are the respective ends of the arms of a V-shaped link 32, that is pivotally connected, at the juncture of said arms, to the axle housing 10 through the agency of a ball and socket joint. The latter comprises a ball member 33 formed integral with the link, and a socket structure 34 that is welded or otherwise secured to medial region of the axle housing 12, substantially at the lowest point of the latter.

The arrangement of the links is such that the axle housing 12 may rise and fall as a whole relatively of the frame 10, or either end thereof may rise and fall, but the latter movement will be resisted to a certain extent by the link 32 for the reason that it is connected to the axle housing at a point well below the axis of the latter. Said link 32 because of its V shape also resists lateral sway of the vehicle frame in the direction parallel to the axis of the axle housing. The two-arm links 28 prevent angular movement of the axle housing parallel to the plane of the frame 10, and they also resist torsional movement of the axle housing in either direction by reason of their two arms which engage the collar 24 at points above and below the axis of the axle, thus providing the mechanical advantage of the resultant leverage. The link 32 also is arranged to resist torsional movement of the axle housing. Because of the presence of the rubber bushings 25 between the collars 24 and the axle housing, the torque resistance of the links 28 is somewhat yielding.

It will be seen that the linkage described will resist or prevent all relative movement between the axle and frame except up and down movement such as bound and rebound, which movement is cushioned and controlled by the pneumatic suspension comprising the bellows 16. Since the latter are positioned outwardly of the vehicle frame beyond the centerline of the inner wheel, they impart greater stability to the body of the vehicle than it is possible to obtain by use of conventional leaf springs.

Figure 5:
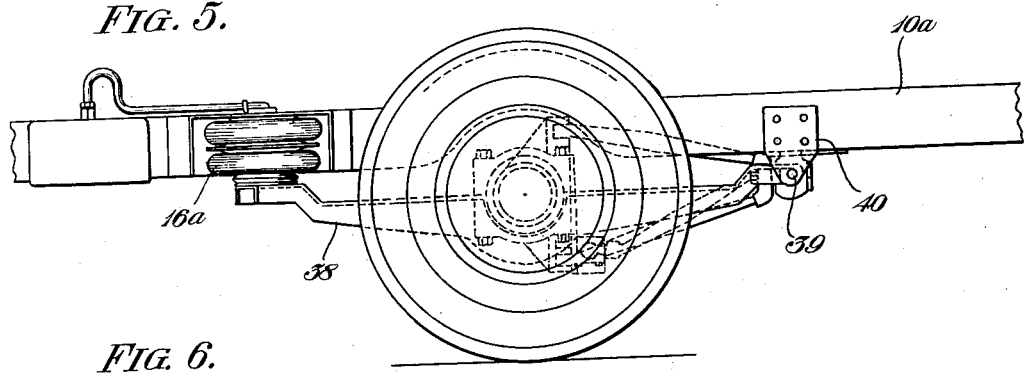
Figure 5 is a side elevation thereof.
Figure 6:
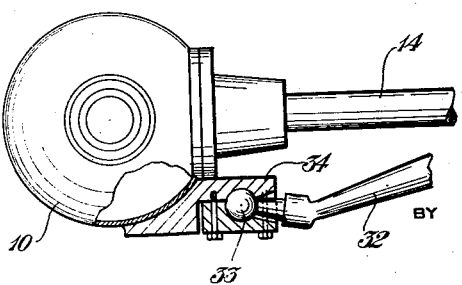
Figure 6 is a sectional detail view of a swivel connection taken on the line 6—6 of Figure 1.

The embodiment of the invention shown in Figures 4 and 5 is provided for vehicles that are not designed to carry as heavy loads as the vehicle previously described. In this embodiment the frame 10a is supported upon the axle housing 12a by means of a single pair of pneumatic suspension devices, the latter being identical with those previously described. To this end a pair of horizontally disposed brackets 38, 38 are secured to the axle housing 12a, one at each end thereof. Rearwardly of the axle housing, each bracket 38 is arcuate in plan so as to extend outwardly beneath the adjacent side-rail of the frame 10a to a point laterally thereof, the bellows 16a of a pneumatic suspension device resting upon the outer end of said arcuate portion of the bracket, and an outboard bracket 22a, secured to the frame 10a, resting upon the upper end of said bellows. Forwardly of the axle housing, each bracket 38 is pivotally connected at 39 to a bracket 40 that is secured to frame 10a upon the under side of a side-rail thereof. The pivotal connections 39 are horizontal and in axial alignment transversely of the frame, thus permitting oscillation of the brackets 38 as the frame rises or falls relatively of the axle housing 12a.

The arrangement of the links and rods that resist relative movement between the frame and axle housing is shown as identical with that described in the preferred embodiment of the invention. Actually this linkage may be of substantially lighter construction for the reason that the brackets 38 are secured directly to the frame at one of their ends, and thus they supplement the linkage in resisting torque reaction of the axle housing, and movement of the latter parallel to the frame of the vehicle.

The invention imparts greater stability to the body of the vehicle, and achieves the other objects set out in the foregoing statement of objects.

Modification may be resorted to without departing from the spirit of the invention, or the scope thereof as defined by the appended claims.

What is claimed is:

1. A suspension system for vehicles comprising a vehicle frame and axle housing including an axle, flexible pneumatic load carrying devices having no substantial inherent resistance to lateral forces operatively positioned between the axle housing and frame, said devices being positioned beyond the lateral limits of the frame and beyond the central plane of wheels carried by said axle, means pivotally connected to the frame and to the axle housing for resisting relative movement therebetween.

2. A suspension system for vehicles comprising a vehicle frame and axle housing including an axle, resilient load carrying devices having no substantial inherent resistance to lateral forces operatively positioned between the axle housing and frame, said devices being positioned before and behind the wheels, and laterally beyond the frame and beyond the central plane of wheels carried by said axle, and means pivotally connected to the frame and to the axle housing for resisting relative movement therebetween.

3. A suspension system for vehicles comprising a vehicle frame and axle housing including an axle, independent flexible pneumatic load carrying devices having no substantial inherent resistance to lateral forces operatively interposed between the axle housing and frame, said devices being positioned before and behind the wheels and laterally of the frame beyond the central plane of wheels carried by said axle, and torque rods yieldingly and pivotally connected to the frame and comprising a yielding connection with the axle housing for yieldingly resisting torque reaction of the latter and means pivotally connected to the frame and to the axle housing for resisting lateral movement therebetween.

4. A suspension system for vehicles comprising a vehicle frame and axle housing including an axle, a plurality of independent resilient load carrying devices having no substantial inherent resistance to lateral forces operatively interposed between the axle housing and frame, and means connecting opposite ends of the axle housing to the frame for resisting torque reaction of said axle housing, said means comprising collars that embrace the axle housing, and bushings of elastic material compressed between the latter and the collars so as yieldingly to resist relative angular movement therebetween and means pivotally connected to the frame and to the axle housing for resisting lateral movement therebetween.

5. A suspension system for vehicles comprising a vehicle frame and axle housing including an axle, a plurality of independent flexible pneumatic load carrying devices having no substantial inherent resistance to lateral forces operatively interposed between the axle housing and frame, and means pivotally connecting opposite ends of the axle housing to the frame for resisting torque reaction of said axle housing, said means comprising collars on the axle housing having yielding connection therewith, and respective links having pivotal connection with the frame, and having pivotal connection with a collar at two separated points on the latter on a line transverse to said axle housing and means pivotally connected to the frame and to the axle housing for resisting lateral movement therebetween.

6. A suspension system for vehicles comprising a vehicle frame and axle housing including an axle, a plurality of independent flexible pneumatic load carrying devices having no substantial inherent resistance to lateral forces operatively interposed between the axle housing and frame, a collar on each end of the axle housing, and respective two-arm links having pivotal connection with said collars and with said frame, said links being connected to said collars above and below the axis of the axle and means pivotally connected to the frame and to the axle housing for resisting lateral movement therebetween.

7. A combination as defined in claim 6 including rubber bushings compressed between the collars and the axle housing for yieldingly resisting relative angular movement therebetween.

8. A combination as defined in claim 6 in which each two-arm link is connected to a collar by axially aligned, vertically disposed pivotal connections.

9. A suspension system for vehicles comprising a vehicle frame and axle housing including an axle, a plurality of individual flexible pneumatic load carrying devices having no substantial inherent resistance to lateral forces interposed therebetween, a collar on each end of the axle housing, and respective two-arm links connecting said collars with said frame, each of said links having ball and socket connection with the frame, and having two vertically aligned pivotal connections to the collar and means pivotally connected to the frame and to the axle housing for resisting lateral movement therebetween.

10. A suspension system for vehicles comprising a vehicle frame and axle housing including an axle, a plurality of individual resilient load carrying devices having no substantial inherent resistance to lateral forces interposed therebetween, a pair of parallel links pivotally connected to the frame and to opposite ends of the axle housing, and a V-shaped link pivotally connected at the ends of its two legs to the respective parallel links, and pivotally connected at the juncture of its two legs to the axle housing in the medial region thereof.

11. A suspension system for vehicles comprising a vehicle frame and axle housing including an axle, a plurality of individual resilient load carrying devices having no substantial inherent resistance to lateral forces interposed therebetween, a pair of parallel links pivotally connected to the frame and to opposite ends of the axle housing, and a V-shaped link pivotally connected at the ends of its two legs to the respective parallel links, adjacent the latter's connection with the frame, and pivotally connected at the juncture of its two legs to the axle housing, in the medial region of the latter and at a point substantially below the longitudinal axis thereof.

12. A combination as defined in claim 11 in which the V-shaped link is connected to the axle housing by means of a ball and socket joint.

13. A combination as defined in claim 11 in which the pivotal connections between the V-shaped member and the parallel links have vertical axes.

14. A suspension system for vehicles comprising a vehicle frame and axle housing, a plurality of independent load carrying devices operatively interposed therebetween, a collar on each end of the axle housing, bushings of rubber compressed between the latter and the respective collars, respective parallel, two-arm links connecting said collars to said frame, said links having ball and socket connection with the frame and being pivotally connected to the collars at two vertically aligned points of which one is below the axis of the axle housing and the other above the same, and a V-shaped link connecting the axle housing to said parallel links, the ends of the two legs of the V-shaped link being pivotally connected on a vertical axis to the respective parallel links, the juncture of the two legs having ball and socket connection with the axle housing in the medial region thereof and substantially below its longitudinal axis.

15. A suspension system for vehicles comprising a vehicle frame and axle housing, a pair of bracket arms each secured in its medial region to the axle housing, at an end thereof, and having one of its ends pivotally connected to the frame, the free end portions of the arms extending laterally outside the frame at least as far as the central plane of wheels carried by said axle, and pneumatic load carrying devices operatively mounted between the frame and the free ends of the respective arms.

16. A suspension system for vehicles comprising a vehicle frame and an axle housing, a pair of bracket arms each secured intermediate its ends to the axle housing at an end of the latter, and having one of its ends pivotally connected to the frame, the free end portions of the arms extending laterally outside the frame at least as far as the central plane of the wheels carried by said axle, and resilient load carrying means operatively associated between the frame and the free end of the respective arms.

ROY WILBUR BROWN.